(12) United States Patent
Smith et al.

(10) Patent No.: US 12,523,822 B2
(45) Date of Patent: Jan. 13, 2026

(54) APPARATUS AND METHOD FOR HOLDING OPTICAL FIBER AND FIBER ARRAYS VIA VACUUM FOR FIBER ALIGNMENT AND ATTACHING

(71) Applicant: Government of the United States as represented by the Secretary of the Air Force, Rome, NY (US)

(72) Inventors: Amos M. Smith, Chittenango, NY (US); Erin C. Sheridan, Oneida, NY (US); Andrew Brownell, Rome, NY (US); Nicholas Barton, Lee Center, NY (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 367 days.

(21) Appl. No.: 18/453,442

(22) Filed: Aug. 22, 2023

(65) Prior Publication Data
US 2025/0067940 A1    Feb. 27, 2025

(51) Int. Cl.
G02B 6/38    (2006.01)
G02B 6/36    (2006.01)

(52) U.S. Cl.
CPC .......... *G02B 6/3858* (2013.01); *G02B 6/362* (2013.01); *G02B 6/3843* (2013.01); *G02B 6/3806* (2013.01); *G02B 6/3825* (2013.01)

(58) Field of Classification Search
None
See application file for complete search history.

(56) References Cited

U.S. PATENT DOCUMENTS

| | | | | |
|---|---|---|---|---|
| 4,436,295 A | * | 3/1984 | Wey | G02B 6/362 269/21 |
| 5,178,723 A | * | 1/1993 | Nguyen | G02B 6/3652 216/36 |
| 5,506,928 A | * | 4/1996 | Evans | G02B 6/362 385/136 |
| 5,758,006 A | * | 5/1998 | Neely | G02B 6/25 385/137 |
| 5,926,594 A | | 7/1999 | Song et al. | |
| 9,638,859 B1 | | 5/2017 | Nuttall et al. | |
| 2003/0002847 A1 | * | 1/2003 | Shekel | G02B 6/3684 385/147 |
| 2003/0103202 A1 | * | 6/2003 | Schmitt | G02B 6/362 356/137 |
| 2016/0124163 A1 | * | 5/2016 | Cabessa | B25J 15/0616 269/21 |
| 2022/0120976 A1 | | 4/2022 | Palone et al. | |
| 2022/0197102 A1 | | 6/2022 | Christen et al. | |

OTHER PUBLICATIONS

Niffenegger, R.I. et al., "Integrated multi-wavelength control of an ion qubit", Nature, vol. 586, pp. 538-542 (2020).

* cited by examiner

*Primary Examiner* — Jerry Rahll
(74) *Attorney, Agent, or Firm* — AFRL/RIJ; Charles R. Figer, Jr.

(57) ABSTRACT

System and method for performing fiber optic alignment and attachment of an industry standard single fiber optic cable or fiber array to the facet of an optical chip. The proposed invention provides a means to gently hold and release a single fiber or fiber array while maintaining tolerance restrictions created by the presence of neighboring fibers or chip carriers via an inverted vacuum system.

23 Claims, 7 Drawing Sheets

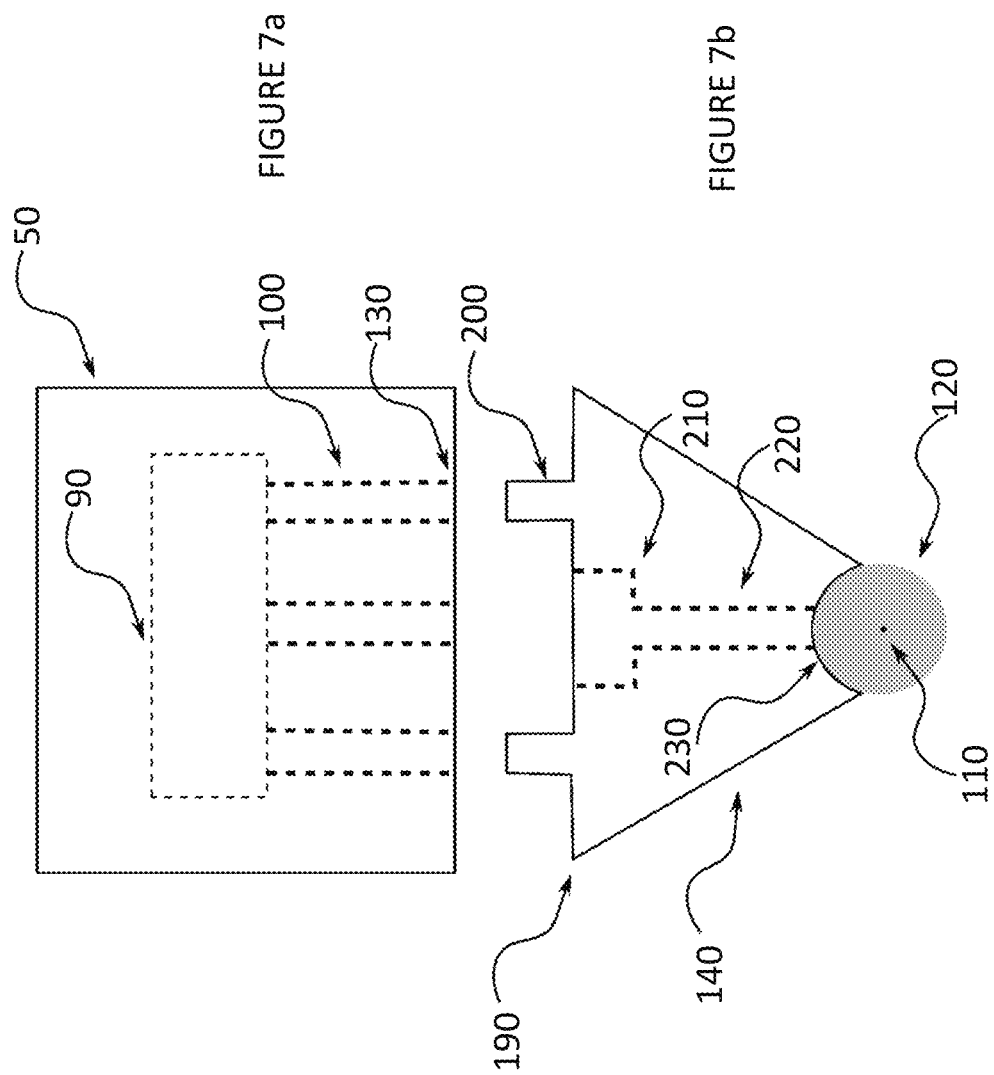

APPARATUS AND METHOD FOR HOLDING OPTICAL FIBER AND FIBER ARRAYS VIA VACUUM FOR FIBER ALIGNMENT AND ATTACHING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to methods for gently holding individual optical fibers and fiber arrays for the purpose of fine pitch optical alignment and or attachment to integrated optical chips via an adhesive.

Fiber alignment and attachment is a practiced art with multiple commercial providers both for the full alignment/attachment system and as a standard service. The majority of such systems and services use mechanical clamping to hold fibers and arrays in the desired position while applying a fast-curing epoxy or other adhesive. This has the advantage of a strong grip and the ability to rotationally align polarization maintaining fiber or other fiber types to the preferred final position.

Vacuum alignment methods have several advantages over mechanical (side to side) clamping in particular and for overcoming difficulties for fiber attachment in general. The state of the art requires the use of multiple micro machined components to create the vacuum channels seen in US 2022/0120976 A1 FIG. 1 and FIG. 9. As such misalignment between components can have detrimental performance, such as reducing vacuum pressure, and can lead to misaligned fibers. Additionally, US 2022/0120976 A1 FIG. 9 shows that the current state of the art still requires covering a solid angle of approximately 180 degrees of the fiber, equivalent to the top half of the fiber. This places the fiber holder on each side of the fiber meaning that it could physically interfere with a neighboring fiber if close to the chip.

Waveguide outputs are spaced at a standard pitch of 127 microns apart, this is called the pitch. This is due to standard telecom fiber having a fixed diameter of 125 microns. 127 micron pitch thus leaves on average a 2 micron gap between any two adjacent fibers when in their final position. Mechanical clamps often physically interfere with this spacing either close to the chip or with the fibers farther away. Such interference risks breaking the small amount of adhesive holding the previously attached fibers in place due to various stresses placed on the fibers and transmitted to the bond surface. Failed or broken bonds can render chips unusable and can prevent attachment at 127 micron pitch altogether.

One difficulty working with such fiber arrays is their size: fiber arrays can be thicker than the integrated optical devices to which they are attached. State of the art and industry standard CMOS compatible chips average approximately 700 micron thick and depending on application can vary in surface area from 1 to hundreds of square mm. Fiber arrays are often 500 micron to several mm thick, depending on method of manufacture, and approximately 10s of square mm in surface area. The clearance tolerances around and underneath fiber arrays can therefore be very tight. In the state of the art, chips are often mounted on larger carriers. The small thickness of the chip and the thickness of the fiber array means there is often less than 700 micron of tolerance between the chip carrier and the bottom of the fiber array once they are aligned in the desired final position.

OBJECTS AND SUMMARY OF THE INVENTION

Disclosed herein are examples of a system and method for performing fiber optic alignment and attachment of an industry standard single fiber optic cable or fiber array to the facet of an optical chip. The proposed invention provides a means to gently hold and release a single fiber or fiber array while maintaining tolerance restrictions created by the presence of neighboring fibers or chip carriers via an inverted vacuum system.

The present disclosure includes an apparatus for aligning optical fiber for fixation, comprising a main body having an inner chamber and an armature having a first end, a second end, and an inner channel pneumatically connecting said first end to said second end. The first end of said armature is mechanically attached to said main body so as to pneumatically connect said inner channel to said inner chamber. The apparatus further includes a fiber-holding head having a plurality of vacuum pores. The fiber-holding head is mechanically attached to said second end of said armature so as to pneumatically connect said inner channel to said plurality of vacuum pores. The apparatus further includes a vacuum attachment having an orifice. The vacuum attachment being mechanically attached to said main body so as to pneumatically connect said orifice to said plurality of vacuum pores via said inner chamber and said inner channel. Further, the apparatus includes a contour formed in said fiber-holding head coincident with said plurality of vacuum pores. The contour has a lengthwise orientation in alignment with said armature.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 7A depicts a side view of a fiber head that accommodates the plugging in of an adapter (as depicted in FIG. 7B) that allows for holding single fibers.

FIG. 7B depicts an end view of an adapter that plugs into a fiber head (as depicted in FIG. 7A) that allows for holding single fibers.

DETAILED DESCRIPTION OF THE PREFERRED EMBODIMENT

Figure 1:
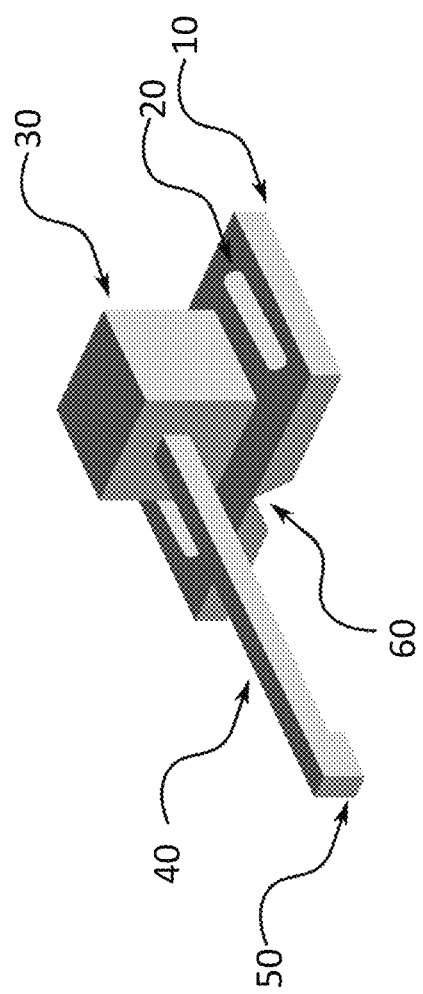
FIG. 1 depicts a perspective view of a preferred embodiment of the inverted fiber array holder showing general proportions of the device including the long fiber array arm, fiber pass through, and mounting holes.

The present invention provides a 3D printed inverted vacuum-based fiber tool that holds the fiber via a low-pressure vacuum from above while contacting a small solid angle of the fiber.

The present invention applies little to no pressure or stress on the fiber. Mechanical clamping force can produce small amounts of birefringence due to stressing the fiber while aligning that vanish after release. Also, the act of releasing the fiber itself can be a strong enough force to break the recently created bond. Waveguide outputs are spaced at a standard distance of 127 micron apart. Thus, only a small amount of adhesive can be applied between the end facet of the chip and the fiber at a given time to avoid covering the neighboring waveguide output and severely reducing the coupling of the neighboring fiber, which is yet to be attached. This yields relatively weak bonds with long and relatively heavy fiber optic cables applying stress to them.

To eliminate the problems associated with prior art mechanical attachment methods, the present invention uses an inverted vacuum system to hold the fiber array gently from above. This allows the sub-millimeter clearance between the fiber array and a chip holder to remain unimpeded and prevents adhesive that may be placed between the two from contacting the vacuum head.

Additionally, the preferred embodiment of the present invention does away with complex manufacturing requirements by creating a fiber attachment, or fiber array attachment system that uses a single monolithic 3D printed fiber head, armature and vacuum connection. This removes the need for micromachining and aligning of vacuum channels, reduces complexity, increases durability, reduces manufacturing costs and adds configurability.

Still, with regard to the present invention's fiber array attachment, fibers are formed into arrays by placing them into a holder called a v-groove in the state of the art. Such a device aligns and holds the fibers at the final desired 127 µm or other pitch in a premade silicon (or other material) plate. The plate is fabricated with the eponymous V shaped groves to align the fibers. Once created, the full array can be aligned and attached, thereby aligning each individual fiber simultaneously. The present invention provides a preferred embodiment that allows for the use of a fiber array.

Therefore, the preferred embodiment of this invention rectifies multiple problems discussed above in the prior art and allows for fiber attachment at 127 micron pitch without adding stress to the fiber during attachment, when releasing the fiber, or when attaching the next fiber, with simplified manufacture, a reduced number of components and more clearance than the state of the art.

The preferred embodiments of the present invention described herein assume that the coupling is being done on the edge facet of the chip, a method known as butt coupling. However, a trivial modification to the present invention allows for use of grating couplers as well: these couplers emit and receive light at an angle through the top surface facet of the chip. A simple modification of the preferred embodiment changes the fiber heads described below to match that preferred angle.

The present invention provides two preferred designs for vacuum holders with some variations, one set intended for single or sequential fiber attachment and one for the attachment of fiber arrays. Typical fiber holding devices traditionally have several shortcomings. One shortcoming involves the clearance to the next fiber in a row on the edge facet. Waveguide outputs are often spaced at an industry standard pitch of 127 micron apart. This is due to standard telecom fiber having a fixed diameter of 125 um. A 127 micron pitch thus leaves no more than 2 micron between adjacent fibers when in the final desired position. To allow for such tolerances, a preferred embodiment of the single fiber alignment head holds the fiber in a concave surface that only covers the top portion of the fiber as opposed to the wedge shape of US 2022/0120976 A1 that by necessity wraps down to the side of the fiber. This contour matches industry standard fiber and provides a tighter seal which in turn requires less vacuum air flow volume. The outer contours of the head itself are such that the edges of the head are swept up and away from any potential neighboring fibers at a sharp angle, unlike the inherent disadvantageous feature of US 2022/0120976 A1. Combined with the fact that the concave section covers a small solid angle from the core of the fiber, the head provides improved clearance. This head shape and vacuum fiber holding system of the present invention allows for 127 micron pitch fibers to be added and adhered in place sequentially.

Of note, the preferred embodiment of the present invention is described as fabricated by 3D printed polymer. A change of the material out of which the invention is 3D printed constitutes a trivial change well within the scope of the invention.

In a preferred embodiment of the present invention, an apparatus for aligning optical fiber for fixation comprises a main body having an inner chamber, an armature having a first end, a second end, and an inner channel pneumatically connecting the first end to the second end. The first end of the armature is mechanically attached to the main body so as to pneumatically connect the inner channel to the inner chamber. A fiber-holding head has a plurality of vacuum pores, and the fiber-holding head is mechanically attached to the second end of the armature to pneumatically connect the inner channel to the plurality of vacuum pores. A vacuum attachment has an orifice, and the vacuum attachment is mechanically attached to the main body to pneumatically connect the orifice to the plurality of vacuum pores via the inner chamber and the inner channel. A contour is formed in the fiber-holding head coincident with said plurality of vacuum pores where said contour has a lengthwise orientation in alignment with the armature.

Alternative embodiments of the present invention include an apparatus for aligning a plurality of optical fibers for fixation itself having a plurality of various embodiments of the invention described herein. Where the end of each of the plurality of armatures is attached to a fiber-holding head with various alignments, each of the plurality of fiber-holding heads are shaped, rotated and aligned so as to eliminate mutual interference therebetween in the fixation of a like plurality of adjacent optical fibers.

Still, in another embodiment of the present invention, a method for aligning optical fiber for fixation, comprises the steps of applying a source of vacuum to a manifold, where the manifold comprises a vacuum input and a vacuum output, and where an inner chamber and inner channel connect the vacuum input to the vacuum output. The vacuum output comprises a surface contour in alignment with and matching the shape of an optical fiber. The surface contour comprises a plurality of vacuum pores therethrough. Applying a vacuum to the vacuum input creates a vacuum at the vacuum pores with the vacuum momentarily securing the optical fiber to the surface contour, through the force of the vacuum for the duration of the application of the vacuum to the vacuum input. Securing the optical fiber to the contour maintains alignment of the optical fiber while secured to the surface contour in a position to facilitate fixation of the optical fiber. Removing the applied vacuum from said vacuum input releases the optical fiber upon fixation.

Referring to FIG. 1, the preferred embodiment of the present invention is shown in a perspective view: A solid rectangular baseplate 10 is integrated into the body for the purpose of mounting. Through holes 20 provide for the purpose of mounting the invention to a nano-positioning system. Other sizes, shapes of the baseplate 10 or holes 20 and methods of attachment to a nano-positioning system represent trivial changes within the scope of the invention and were selected in the preferred embodiment for compatibility with available systems.

The main body of the invention 30 connects the vacuum attachment point (not seen in this perspective) to the baseplate 10 and armature 40. The cross section of the armature 40 (see FIG. 3) in the preferred embodiment is square for ease of 3D printing but other cross sections are equal in function. Likewise, the armature 40 exits the main body 10 perpendicularly in the preferred embodiment but other angles are equally functional and depend on the orientation of the rest of the experimental setup. The length of the armature 40 is arbitrary and based on the experimental setup to avoid colliding with the chip mount. As such changes to these features of the armature 40 represent trivial changes.

Figure 2:
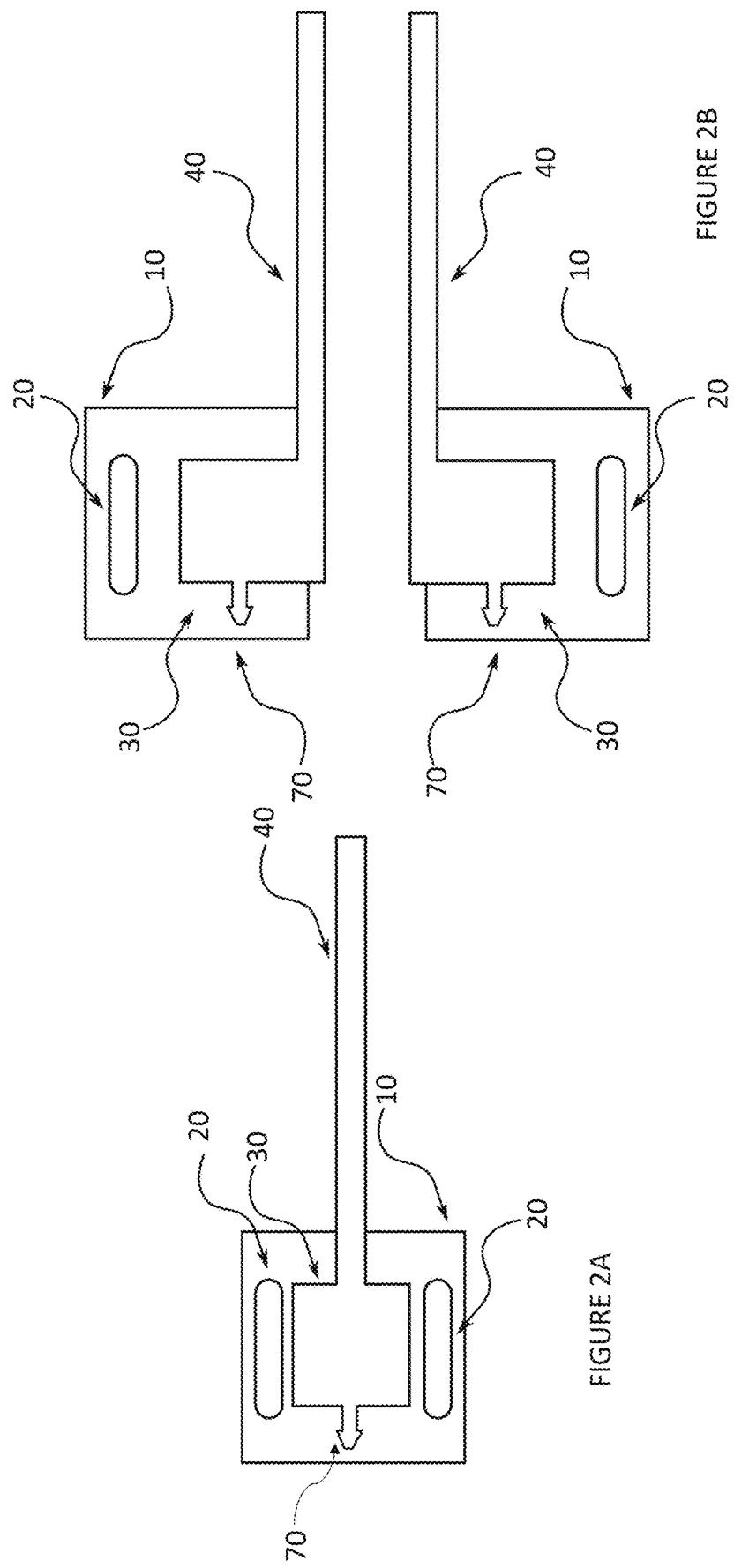
FIG. 2A depicts a bird's eye schematic of the same device as FIG. 1 showing vacuum barb among other features in a preferred embodiment.
FIG. 2B depicts a bird's eye schematic of another embodiment of the same device as FIG. 1 showing vacuum barb among other features.
Figure 4:
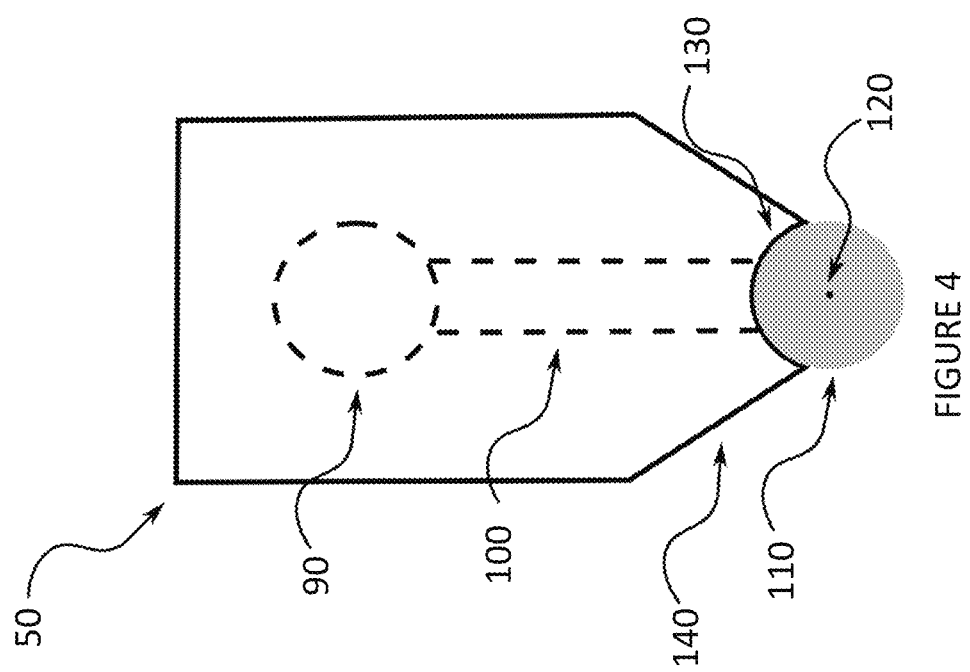
FIG. 4 depicts a close up schematic of the single fiber embodiment of the fiber head. This view is looking backward down the direction of the fiber optic cable and also shows a representative fiber optic cable. The view shows the small contact area between fiber and fiber head and the side clearance that allows multiple fibers to be attached at 127 micron spacing.
Figure 5:
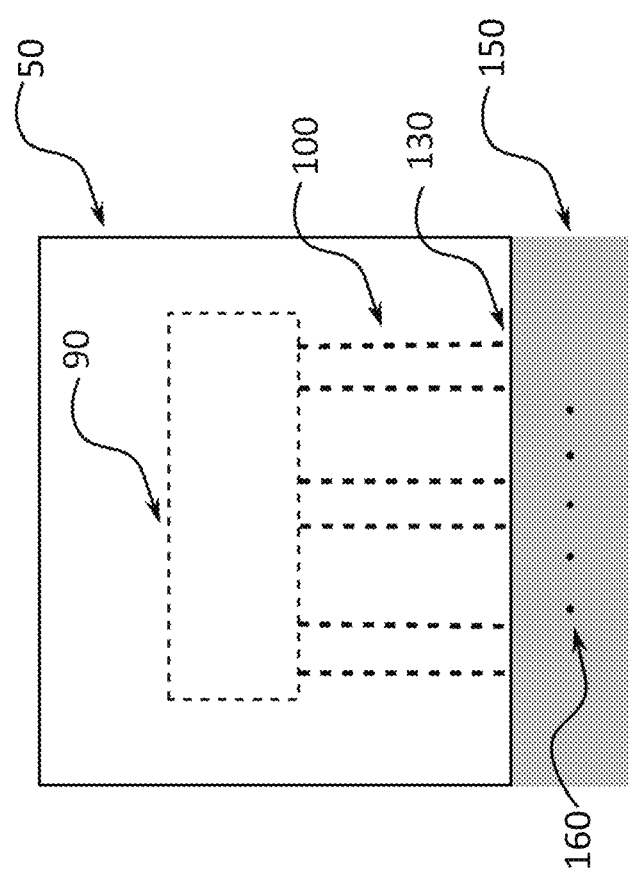
FIG. 5 depicts a close up schematic of the fiber array embodiment of the fiber head. This view is looking backward down the direction of the fiber optic cable and also shows a representative fiber array.

Still referring to FIG. 1, armature 40 mechanically connects the main body 30 to the fiber head 50. The armature 40 also pneumatically connects the vacuum attachment point (see FIG. 2, 70) at the main body 30 to the fiber head 50 via the armature channel (see FIG. 3, 90). The details of the fiber head 50 are shown in FIGS. 4 and 5. The fiber relief groove 60 is a groove or notch across the base plate 10 that allows for fibers to pass freely under the base of the invention without applying additional stress or pressure. Given the inverted nature of the fiber head 50 this feature is useful as the fiber optic cables (not depicted here) will usually interfere with the base plate 10. In the preferred embodiment it is depicted as a V-groove 60 but any contour is equal in functionality and represents a trivial change.

Referring to FIG. 2A, showing a top view of the preferred embodiment from FIG. 1 including the baseplate 10, mounting holes 20, main body 30, and armature 40 are shown. The vacuum attachment in the preferred embodiment is an industry standard vacuum barb 70 depicted here as a simplified schematic. The vacuum barb 70 has an inner orifice that passes into the main body. The preferred embodiment can make use of any existing state of the art vacuum system, as such it is not shown here. Other methods of attaching the vacuum system such as press-to-fit or threaded connectors are functionally equivalent to 70 and represent trivial changes. In the preferred embodiment the vacuum barb 70 is 3D printed as an integrated component of the main body 30 for ease of use and reduction of complexity.

Other methods of attaching a vacuum line or port including but not limited to threaded holes and push to connect fittings are trivial changes to the design. The preferred design uses a vacuum barb as shown because it can be easily 3D printed along with the rest of the device.

Referring to FIG. 2B, a preferred embodiment is depicted with the armature 40 emerging perpendicularly from the center of the main body 30. Alternative embodiments such as offsetting the point on the main body 30 from which armature 40 emerges or changing the angle of the armature 40 along with offsetting the position of the base plate 10 and mounting holes 20 can create right and left-handed embodiments as trivial variations of the invention herein. When placed in close proximity on independent nano-positioning systems (standard art, not shown) these can provide the capability for alignment of two or more fibers simultaneously (see FIG. 6).

Figure 3:
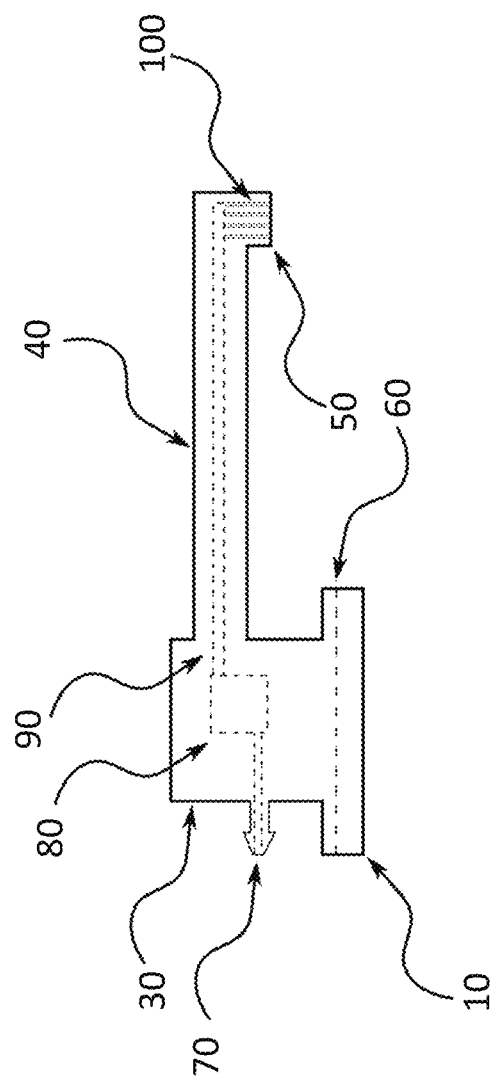
FIG. 3 depicts an internal side view of the preferred embodiment of the device showing the internal structure of air passages guiding the vacuum from the rear barb to the fiber head.

Referring to FIG. 3, showing a side view cross section of the interior of the preferred embodiment. Base plate 10, main body 30, armature 40, fiber head 50, and fiber relief groove 60 are shown. Also shown by the dotted channel is the end-to-end depiction of the invention's vacuum channel, providing a pneumatic connection, extending from the vacuum barb 70 through an internal space forming an inner chamber 80, through armature channel 90 though a plurality of fiber head pores 100. A plurality of fiber head pores 100 aligned in a row are discussed in greater detail in FIGS. 4 and 5. These features 70, 80, 90, and 100 channel the vacuum pressure from the vacuum system (not shown) to the fiber head 50 such that there is a vacuum pressure created at the fiber head pores 100 sufficient to pull and hold the fiber or fiber array to the fiber head 50. In essence, the view of the invention as depicted in FIG. 3 depicts a highly specialized form and function of a vacuum manifold. The shape of the internal space 80 and armature channel 90 are arbitrary and need only to be connected such that there is a clear internal passage so that a vacuum applied at the vacuum barb 70 results in a vacuum at the row of fiber head pores 100. The diameter of the vacuum pores are chosen in consideration of the minimum resolution of the 3D printer and to best match the fiber (FIG. 4, 110), or fiber array (FIG. 5, 150). Simple changes to the geometry of these contours represent trivial changes to the operation of the device.

Referring to FIG. 4, a schematic view of the preferred embodiment for attaching a single fiber to a chip at a time is shown. Note relative dimensions are not to scale, with the drawing sized for clarity. The preferred embodiment for attaching a single fiber to a chip comprises a fiber head 50 with specific features fit for this purpose. Shown are the armature channel 90 and fiber head pores 100. Also shown is the end facet of a fiber optic cable 110 correctly held in the fiber head 50. The core of the fiber 120 carries the optical signal and is the part of the fiber that needs to be correctly aligned to the optical device.

Note the contour of the fiber head at the point where the fiber makes contact is an arc 130 such that its radius of curvature matches the industry standard for optical fiber. The arc 130 is also less than 180 degrees of solid angle about the core of the optical fiber. This smaller solid angle allows for the neighboring fiber to be attached. Different types of fiber may have different radii of curvature and the fiber head 50 may be modified to match as a trivial change.

It is within the scope of the present invention to provide several such fiber heads 50 with arc 130 radius of curvature being specifically different as dedicated to different fibers. The arc 130 radius of curvature is significantly less than 180 degrees in solid angle. This feature facilitates placing two fiber next to each other. If the fiber head 50 wrapped down to the sides of the fiber 110 it would interfere with neighboring fibers in the final configuration thus risking breaking them. The outside contours 140 of the fiber head 50 are sharply swept upwards to avoid any potential neighboring fibers, or fiber heads. Variation of the arc's 130 radius of curvature, solid angle and fiber head 50 contours 140 represent trivial changes in the design and are well within the scope of the present invention.

In order to hold the fiber 110 in arc 130, the vacuum pores 100 are aligned in a single row in the long dimension of the fiber head 50. The pores 100 are designed to be smaller in diameter the than the cross section of arc 130. The standard fiber is 125 micron in diameter, thereby setting an upper limit to the diameter of a vacuum pore 100. Any larger diameter would allow air to flow around the fiber 110 and reduce the vacuum force.

Referring to FIG. 5, showing a cross section schematic of the fiber head 50 for an alternate embodiment of the invention that is meant for attachment of fiber arrays 150 rather than individual fibers (see FIG. 4, 110). The advantage of fiber arrays 150 is that they contain more than one fiber with the required final spacing already created between the multiple cores 160. Thus, multiple fibers are aligned at one time. Fiber arrays 150 vary in dimensions but are mostly rectangular. Thus, what was an arc (see FIG. 5, 130) in the fiber head 50 designed for a single fiber 110, is now a flat contour 130 for a fiber array 150. Accordingly, the plurality of vacuum pores 100 are now aligned in a plurality of rows and columns. The exact dimensions and pitch of which can be matched to the size of the fiber array 150 of choice. The armature channel 90 in this embodiment is shown as a rectangle in order to connect to all vacuum pores 100 to the vacuum source. This flat contour 130 is as easy as any other to create via 3D printing and severs to show that the exact contour 130 of the armature channel 90 can be trivially changed to some variation from the contour depicted here that is flat is shape.

Figure 6:
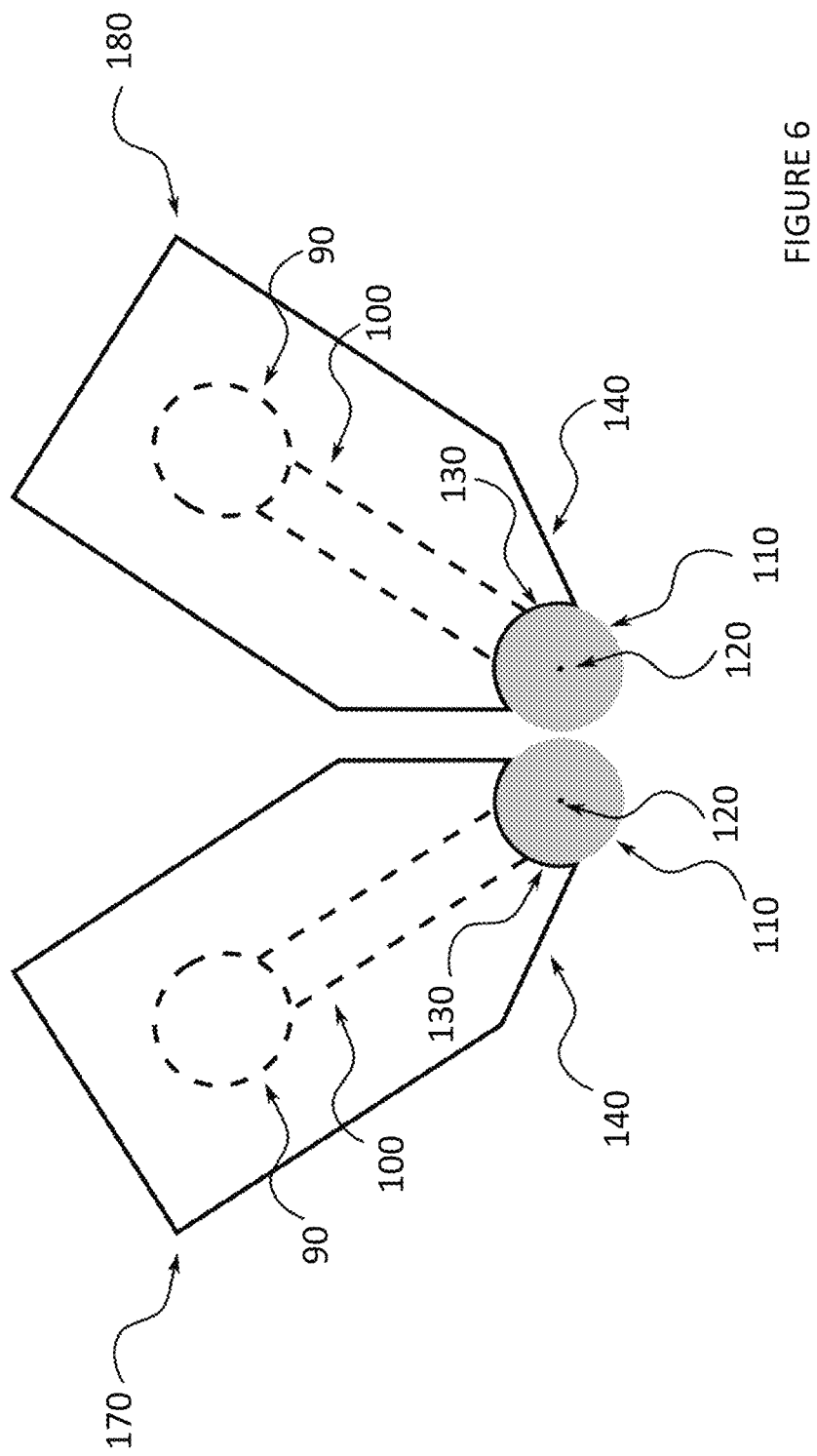
FIG. 6 depicts a close up schematic of two rotated fiber heads for the purpose of aligning two arbitrarily close together fibers at the same time. This view is looking backward down the direction of the fiber optic cable.

Referring to FIG. 6, showing a cross section schematic of two alternative embodiment fiber heads 170, 180 otherwise identical to previously depicted fiber head 50, being rotated by approximately 45 degrees about an axis parallel to the fiber 110, and fiber core 120, comprising a configuration of left 170 and right 180 handed fiber heads, respectively. Such embodiments as shown here allow for simultaneous alignment of two or more fibers using two or more embodiments of the invention (right 170 and left 180 handed), rather than sequential attachment. Such rotations are simple to make via 3D printing and the exact angle of rotation is a trivial change. This rotation along with the alternative right- and left-handed armatures 40 (as described in FIG. 2), with the narrow solid angle of arc 130, and the steeply swept sides 140 allows for two fibers 110, 110 to be aligned simultaneously to two waveguides (not shown) fabricated with arbitrarily spacing (greater than the fiber diameter 110). Thus, the present invention provides improved clearance and additional degrees of freedom during alignment. In an application within the scope of the present invention where the alignment of more than two, i.e., a plurality of optical fibers 110 are to be attached simultaneously, fiber heads 170, 180, and so on would feature swept sides 140 of various non-interfering shapes. The fiber heads will not interfere with each other before the fibers themselves collide.

Referring to FIG. 7A and FIG. 7B concurrently, showing a cross section schematic of a fiber head 50 designed for fiber arrays similar to FIG. 5 and an adapter 190 that allows for holding single fibers 120 similar to FIG. 4. This adapter allows for all of the beneficial features of the present invention as depicted in FIG. 4 while not requiring the full body 30 (not shown) of the invention to be removed in order to rapidly switch fiber head types 50 for arrays (see FIG. 5, 150) and single fibers (see FIG. 4, 110). The adapter 190 has plugs 200 that align with and fill a subset of the vacuum pores 100 in the fiber head 50 and matches the contour 130 of the head 50. The adapter 190 is held in place by either vacuum pressure or mechanical friction between 100 and 200 or a combination thereof. The adapter has a vacuum chamber 210 which aligns to the remaining unplugged vacuum pores of the fiber head 50. The vacuum chamber 210 has additional vacuum pores 220 that connect to the arc 230 for holding the fiber 120 via vacuum pressure similar to the embodiment depicted in FIG. 4.

What is claimed is:

1. An apparatus for aligning optical fiber for fixation, comprising:
 a main body having an inner chamber;
 an armature having a first end, a second end, and an inner channel pneumatically connecting said first end to said second end,
  said first end of said armature being mechanically attached to said main body so as to pneumatically connect said inner channel to said inner chamber;
 a fiber-holding head having a plurality of vacuum pores;
  said fiber-holding head being mechanically attached to said second end of said armature so as to pneumatically connect said inner channel to said plurality of vacuum pores;
 a vacuum attachment having an orifice;
  said vacuum attachment being mechanically attached to said main body so as to pneumatically connect said orifice to said plurality of vacuum pores via said inner chamber and said inner channel; and
 a contour formed in said fiber-holding head coincident with said plurality of vacuum pores;
  said contour having a lengthwise orientation in alignment with said armature.

2. The apparatus of claim 1, further comprising a baseplate onto which said main body is attached.

3. The baseplate of claim 2, further comprising relief groove to permit optical fiber to pass under said baseplate.

4. The baseplate of claim 2, further comprising through holes to permit mounting said baseplate to a positioning system.

5. The apparatus of claim 1, wherein said vacuum attachment is a vacuum barb.

6. The apparatus of claim 1, wherein said contour comprises an arc with a radius matching a radius of an optical fiber to be affixed.

7. The apparatus of claim 1, wherein said contour of said fiber-holding head comprises a surface profile matching a surface profile of an optical fiber array to be affixed.

8. The apparatus of claim 7, wherein said plurality of vacuum pores are arranged in rows and columns so as to form an array of vacuum pores.

9. The apparatus of claim 8, further comprising a single optical fiber adapter, said adapter further comprising:
 a mating surface having a profile matching said contour;
  said mating surface further comprising plugs that removably interlock with and pneumatically block a subset of said array of vacuum pores so as to removably attach said adapter to said fiber-holding head;

a fiber-holding surface having a lengthwise orientation in alignment with said armature and having a plurality of secondary vacuum pores therethrough; and an internal vacuum chamber which pneumatically connects said plurality of secondary vacuum pores to an unblocked subset of said array of vacuum pores.

10. The apparatus of claim 9, wherein said fiber-holding surface comprises an arc with a radius matching a radius of an optical fiber to be affixed.

11. The apparatus of claim 1, being fabricated by 3D printing.

12. An apparatus for aligning a plurality of optical fibers for fixation, comprising:

a main body having an inner chamber;

a plurality of armatures having a first end, a second end, and an inner channel pneumatically connecting said first end to said second end, said first end of each of said plurality of armatures being mechanically attached to said main body so as to pneumatically connect said inner channel to said inner chamber;

a plurality of fiber-holding heads each having a second plurality of vacuum pores:

each of said plurality of fiber-holding heads being mechanically attached to said second end of each of said plurality of armatures so as to pneumatically connect said inner channel to said second plurality of vacuum pores:

a vacuum attachment having an orifice:

said vacuum attachment being mechanically attached to said main body so as to pneumatically connect said orifice to said second plurality of vacuum pores in each of said plurality of fiber-holding heads via said inner chamber and said inner channel; and a contour formed in each of said plurality of fiber-holding heads coincident with said second plurality of vacuum pores:

said contour having a lengthwise orientation in alignment with said armature.

13. The apparatus of claim 12, wherein each of said plurality of fiber-holding heads are shaped so as to eliminate mutual interference therebetween in the fixation of a like plurality of optical fibers.

14. The apparatus of claim 12, further comprising a baseplate onto which said main body is attached.

15. The baseplate of claim 14, further comprising relief groove to permit optical fiber to pass under said baseplate.

16. The baseplate of claim 8, further comprising through holes to permit mounting said baseplate to a positioning system.

17. The apparatus of claim 12, wherein said vacuum attachment is a vacuum barb.

18. The apparatus of claim 12, wherein said contour comprises an arc with a radius matching a radius of an optical fiber to be affixed.

19. The apparatus of claim 12, being fabricated by 3D printing.

20. A method for aligning optical fiber for fixation, comprising the steps of:

applying a source of vacuum to a manifold, where said manifold comprises a vacuum input and a vacuum output, and where an inner chamber and inner channel connect said vacuum input to said vacuum output;

said vacuum output comprises a surface contour in alignment with and matching the shape of an optical fiber; and said surface contour comprises a plurality of vacuum pores therethrough;

applying a vacuum to said vacuum input so as to create a vacuum at said vacuum pores;

momentarily securing said optical fiber to said surface contour, through the force of said vacuum, for the duration of the application of said vacuum to said vacuum input;

maintaining alignment of said optical fiber while secured to said surface contour in a position to facilitate fixation of said optical fiber; and removing said applied vacuum from said vacuum input upon fixation of said optical fiber.

21. The method of claim 20, where said contour is an arc having a radius substantially equivalent to a cross sectional radius of said optical fiber.

22. The method of claim 20, where said manifold further comprises a base having a mounting flange with an underside groove.

23. The method of claim 22, further comprising the step of routing said optical fiber through said underside groove so as to maintain alignment with said contour.

* * * * *